June 18, 1940.   O. HELLER   2,205,011
APPARATUS FOR PRODUCING ACTIVATED CARBONACEOUS MATERIALS
Original Filed Oct. 22, 1934   2 Sheets-Sheet 1

Inventor:
Oswald Heller
By [signature]
Att'y

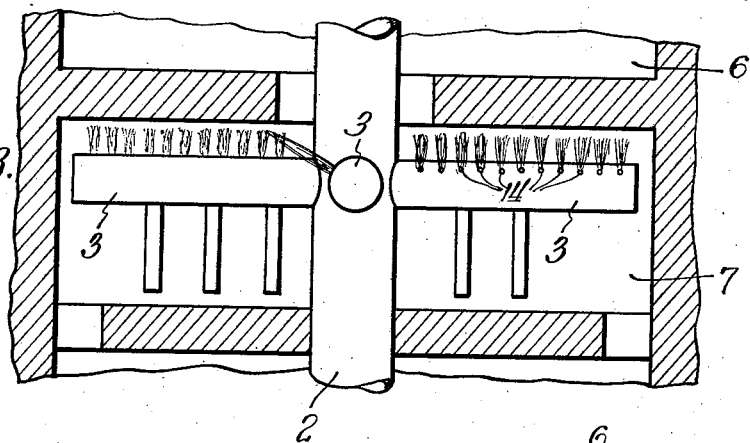
Fig. 3.
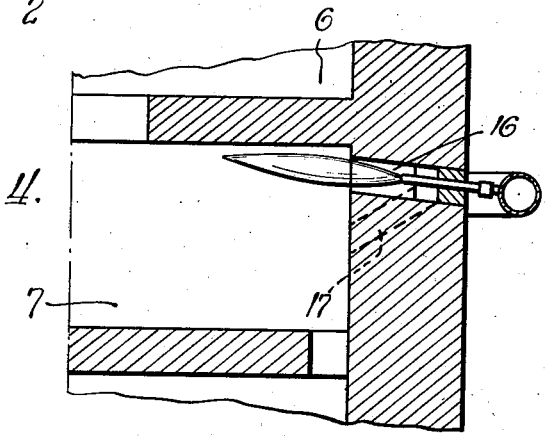
Fig. 4.
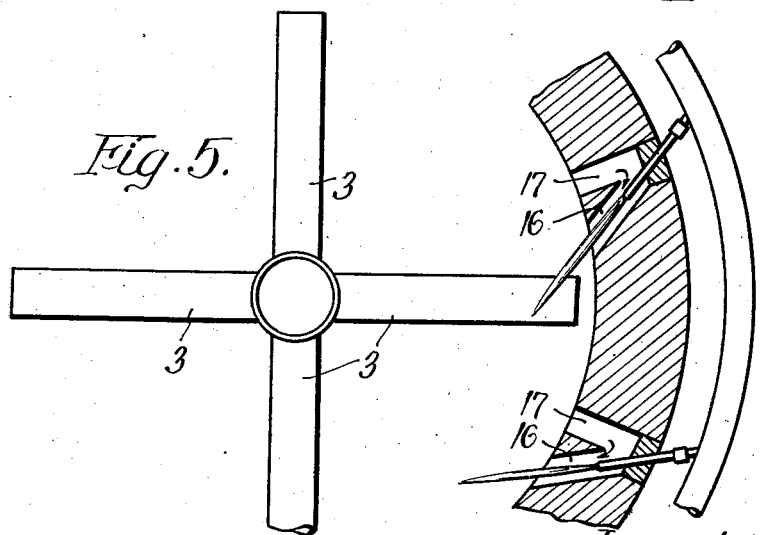
Fig. 5.
Inventor:
Oswald Heller
By [signature] Atty.

Patented June 18, 1940

2,205,011

UNITED STATES PATENT OFFICE 2,205,011

APPARATUS FOR PRODUCING ACTIVATED CARBONACEOUS MATERIALS

Oswald Heller, London, England

Application October 22, 1934, Serial No. 749,496.
Renewed November 15, 1939. In Czechoslovakia October 25, 1933

5 Claims. (Cl. 202—104)

This invention relates to an apparatus for the manufacture of active carbon.

The manufacture of active carbon by activating vapors and gases at correspondingly high temperatures is known.

These processes are carried out mainly by allowing steam to react with the carbon of the activation material to produce hydrogen and carbon dioxide, or carbon dioxide is converted with carbon to carbon monoxide. Since these processes are endothermic, the heat necessary for carrying out the process is in most cases conducted indirectly through heating walls; there are, however, processes wherein the activation material is brought directly into contact with the combustion gases of air with a liquid or gaseous fuel. In all these processes the heat supply is effected by fuels which are not directly involved in the process and which after combustion has taken place, are not contained in the activated material.

The subject of the invention is an apparatus for the production of active carbon from carbonaceous granular, powdery or pressed materials, by gas activation, and is characterized thereby that in a vertically disposed and preferably cylindrical reaction zone the diameter of which is greater than its height, the activation material is placed in a thin layer on a suitable support on which it is stirred by mechanical means and on its surface is continuously swept or fanned by a circulating stream of gases containing activating agents ($H_2O$, $CO_2$) and combustible reaction products (CO, $H_2$) and that oxygen or oxygen containing gases are introduced in the upper part of the reaction zone above the activation material through a considerable number of inflow apertures in such a manner that the inverted flames produced at the inflow apertures do not strike against the activation material, so that only the activating vapors and gases ($H_2O$, $CO_2$) enter into reaction with the carbonaceous activation material with absorption of heat, whereby combustible reaction products (CO and $H_2$) are evolved and these again react completely or partially with the reaction agent ($O_2$) with evolution of heat, whereby activating gases and vapors are again formed so that in the gas zone of the reaction space or zone at corresponding high temperatures a chemical and thermal reciprocal action takes place on the one hand between the carbonaceous activation material and the activating vapors and gases and on the other hand between the combustible reaction products and the reaction agents).

The following terms are used in the present description and in the claims:

The term "activation material" means the carbonaceous material to be activated. The term includes all materials containing carbon, e. g., wood, peat, wood charcoal, brown coal, peat coal, pit coal, anthracite, all vegetable, mineral and animal raw materials, which as known per se can be used for the production of active carbon. These raw materials are suitable for the process according to this invention especially when in granular, fine granular or dust-like condition, i. e., in a condition in which the material would offer a high resistance against activating gases passing through it from the bottom to the top.

The term "activating agents" means those gases, for example, steam, carbon dioxide and the like, which enter directly into reaction with the activation material and cause the activation.

The term "reaction products" means those combustible gases, such as carbon monoxide and hydrogen, which are evolved during the activation.

The designations "reaction agent" or "oxygen-containing gases" means that substance, such, for example, as air or oxygen, which again forms an activating agent with the reaction products.

According to the invention, the carbonaceous activation material which may be granular or powdery insofar as it has received no thermal pretreatment or pre-coking, is introduced into the process in such a way that it moves in counter-current to the hot gases evolved in the process. Thus the activation material is subjected at high temperatures to drying, slow heating, calcining and heating, so that it is brought in communication with the activating agents in a coked and highly heated state.

During the travel of the activation material in counter-current to the hot gases the distillation products which are peculiar to the corresponding activation material become free and are collected in a condenser installation. The condensation products are, for example, with coal, peat and the like, tar and other liquid hydro-carbons; with wood or woodlike products the condensation products are tar, acetic acid, wood spirit and the like and combustible gases, as is generally known.

In the case that thermal pretreated or pre-coked products are used as activation material, these are likewise introduced into the process in counter-current to the hot gases, whereby drying, continual calcining and a high preheating of the activation material is effected before entering into the reaction zone. The high preheating is effected by heating to high temperatures effected by hot gases leaving the reaction zone at a temperature of about 1000° C. and passing upward in counter-current to the incoming "activation material." The introduction of the activation material into the process takes place in this connection preferably with stirring and turning.

The reaction agent which consists of oxygen or air, and the activating agent, steam, are preferably introduced into the reaction chamber in a highly heated state. The heating of the reaction and activating agents can be effected partly by direct heating, partly by means of the sensible heat of the hot gases leaving the process, which are obtained as follows: oxygen containing gases, e. g., air, are continuously introduced in the reaction zone as well as steam, the quantity of oxygen introduced being always smaller than the quantity of combustible gases evolved in the activation process. Therefore, the gases which in turn must leave the reaction zone are free from oxygen and consist of a mixture of $CO_2$ and $H_2O$ (activating agents) and CO and H (reaction products) and nitrogen and a further excess of steam fed to the reaction zone. This mixture of gases has a somewhat similar composition to generator gas produced in the gasification of coke.

The activation process between the pretreated activation material and the activating agent proceeds in the following way:

The activation material which is, for example, at a temperature of 800° C. to 1000° C. and the activating agent the temperature of which is, for example, 100° C. to 200° C. greater, react together so that the steam and the carbon dioxide are converted with a part of the carbon of the pre-treated activation material according to the following equations:

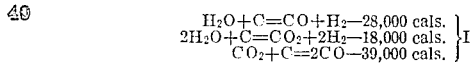

These processes taking place side by side are endothermic and consequently they require a heat supply. The combustible gases, carbon monoxide and hydrogen, are evolved as reaction products.

The reaction agent, i. e., oxygen containing gas, is introduced in such a way that it enters into reaction with the combustible gaseous reaction products of the activation material without directly coming into contact with the activation material. Further, the energy of the oxygen or oxygen containing gas produces a circulation of the gases in the reaction zone whereby the activation process and the production of the combustible gases as reaction products is enhanced.

The oxygen burns thus with the gaseous reaction products of the activation material according to the following equations:

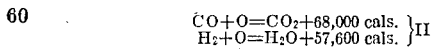

These reactions are exothermic, that is to say, they proceed with the evolution of heat.

Carbon dioxide and steam are again evolved from the oxygen containing gas and the reaction products and again enter into reaction with the activation material so that the above described process is repeated.

There is thus a continual reciprocal action between the activation material, the activating agent and the oxygen in the reaction zone without the activation material and oxygen coming directly into contact with each other.

In order to keep these two reactions apart in a commercial operation, the oxygen or oxygen containing gas is introduced in a fine state of division into the space disposed, for example, above the activation material in such a way that it burns the reaction products with a short flame. Since the combustible reaction products are present in excess in the corresponding zone, the oxygen burns in an atmosphere of combustible gases with an inverted flame; it burns therefore not as combusible gas burns normally in atmospheric air, but inversely it burns the air in a chamber which is filled with a combustible gas.

The products of combustion (the activating agent) thus formed come now continuously in contact with the activation material and are repeatedly converted to combustible gases.

Since in the Process II the evolution of heat is greater than the supply of heat required for Process I, the heat supplied requisite for the Process I is in this way delivered.

It is evident that the gaseous atmosphere has a higher temperature than the activation material since in the atmosphere there is an exothermic process and in the activation material an endothermic process.

The pretreatment of the activation material in the drying, slow heating, calcining and heating zones through which the activation material is moved before entering the reaction zone is of particular importance. Because the continuously moved activation material is slowly heated and calcined in a short time in a scavenging gas stream, the tar is driven out to a greater extent than in normal slow heating or coking processes so that the yield of tar and oils is greater and the yield of coked material is smaller. The smaller yield of coked material can be traced back to the fact that practically no cracking products of the tar in the form of carbon, which is unfavorable for the activation, are contained in the activation material. Moreover, the activation material arrives without being intermediately cooled, in a hot state in the reaction zone in which state it cannot absorb gases, this being of importance in particular when using wood or sawdust.

The activation material thus pretreated behaves during activation differently to, for example, normal charcoal which is worked up to active carbon by other processes.

The method of pretreatment of the activation material contributes to obtaining an active carbon of very small volume-weight which has a filtering capacity above the normal standard and has a very high activity.

The treatment of the continuously moved activation material, which is granular or powdery and which is swept in a sharp current by the activating agents results thereby in very favorable conditions for good activation, a very large content of highly activated particles and a small content of not fully activated particles. The activating process is thus so conducted that a comprehensive and penetrating contact of the activation material and of the activating agents results in all parts so that in this way are also obtained the above described good properties of the final product.

One embodiment of an apparatus for carrying out the process is illustrated in Figures 1 to 5.

Figs. 3, 4 and 5 illustrate how the reaction agent (air or oxygen) is introduced into the reaction zone.

Figure 1:
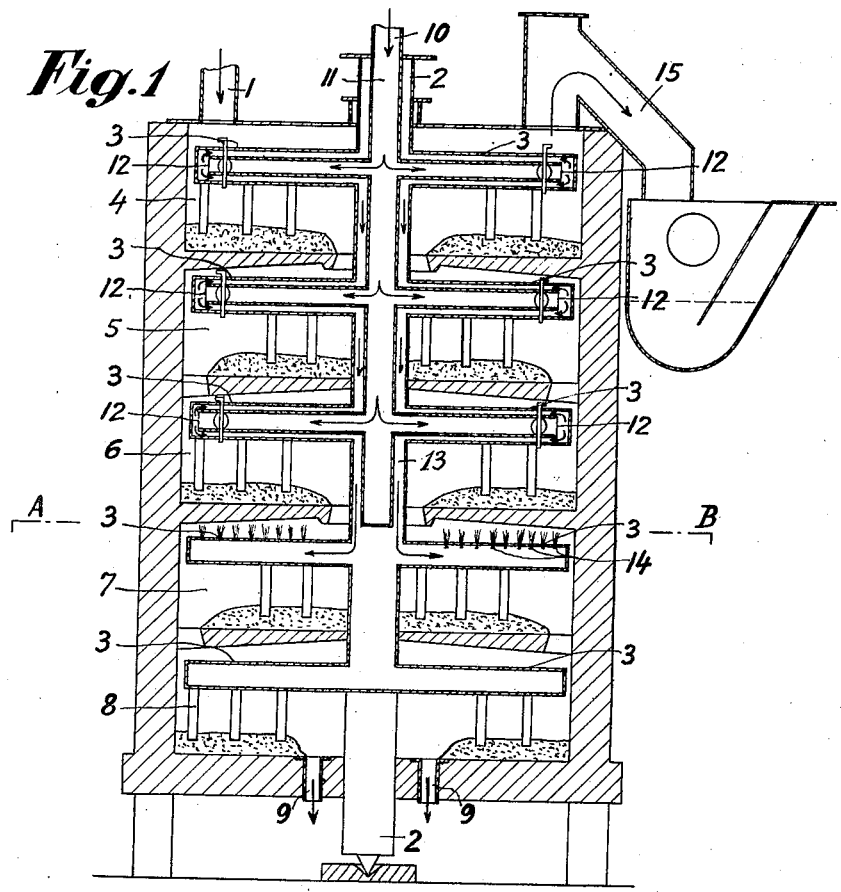
Fig. 1 shows the installation in vertical cross section.
Figure 2:
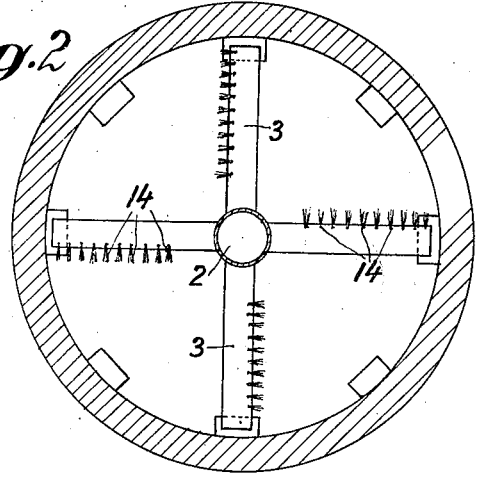
Fig. 2 is a section on line A—B.

and replaced by a mold 30ª, having an upstanding annular shoulder 30ᵇ thereon which engages in a recess provided in the lower end of the nozzle 17. Arranged within the lower end of the mold 30ª is a plunger 39 having a stem 40 which projects through the lower end of the mold. The guide block 37 is also replaced by guide block 37ª having a projection 41 thereon. The piston 39 also has a projection 42 thereon. The form or core 35ª consists of a solid annular member formed of suitable material, such as baked or unbaked lava or preformed refractory material. The resistor is wound on the form or core, as shown most clearly in Fig. 4. The form or core is placed within the mold and is centrally positioned therein by means of the projections 41 and 42 which engage in corresponding depressions formed in the core. When the parts are in the position shown in Fig. 4, the plunger is actuated to extrude the plastic refractory material into the mold and about the resistor in a manner hereinbefore described. After the mold has been filled with the refractory material, the mold is removed and the unit forced out of the mold by means of the plunger 39. When permissible the sides of the mold may be slightly tapered so as to facilitate removal of the element. The completed element is shown in Fig. 5.

In Fig. 8 there is illustrated one manner of insulating a resistor of the sheathed type. In insulating this type of unit the collet 28 is replaced by resistor supporting member 28ᵇ having a depression in its upper face adapted to receive the sheath therein. The form or core 35ª is positioned within the sheath with the resistor 36 wound thereon as shown. The nozzle 17 engages the upper end of the sheath and the sleeve 22 engages over the guide block 37 which in turn engages the form or core and serves to position the same within the sheath. After the parts are moved to the position shown in Fig. 8, the insulating material is extruded into the sheath and about the form or core in the manner hereinbefore described.

In Fig. 9 there is disclosed a slightly different form of nozzle and sleeve which is adapted for use in extruding a tube of insulation material over a straight resistor, such as a carbon rod of the "globar" type. A suitable resistor support 28ᶜ is provided which has an upstanding portion which serves to position the resistor. A guide block 37ᵇ is provided which has a projection thereon adapted to engage the upper end of the resistor and position the same. The nozzle of the sleeve 22ª engages over the end of the guide block 37ᵇ as shown in Fig. 9. The insulation forming material is extruded through the nozzle 17ª as indicated by the dot-and-dash lines in Fig. 9. In Fig. 10 there is disclosed the insulated resistor arranged within a sheath 43. In Fig. 11 there is disclosed a horizontal sectional view in which the reference character 44 designates the carbon rod over which is extruded a tube or coating of insulation material 45 and which is enclosed within the sheath 43.

Figs. 12 and 13 disclose two types of units which may be insulated in accordance with our method.

Figs. 14 and 15 are sectional views of two other types of units which may be insulated according to the method herein disclosed. The reference character 35ᵇ designates the form or core on which the resistor is positioned. Figs. 16 to 21 inclusive illustrate a few of the different types of resistor and heating elements which may be insulated according to our process and which may be solid or hollow, sheathed or unsheathed or formed with or without a preformed core.

It is of course understood that the nozzle 17 and the sleeve 22 may be modified so as to be suitable for forming different types and shapes of units. The shell or cartridge may also be formed of any suitable material. The form or core may also be formed of any suitable material and in some cases entirely dispensed with, depending upon the particular type of unit. The apparatus for carrying out the method herein disclosed is merely illustrative and is not to be considered in a limited sense. The means for forcing the insulating material from the mold or for moving the mold into engagement with the nozzle may also be modified as desired. The cylinder 1 should be of considerable capacity and should be so mounted as to permit its being filled without entirely detaching the same from the apparatus. One type of apparatus is shown and described in our co-pending application Serial No. 428,666, filed of even date herewith.

Throughout the specification and claims we have referred to "insulation forming material" and "insulating material". By these expressions we mean to include any material which is already an electrical insulator, such as zirconium silicate, aluminum oxide or magnesium oxide in comminuted form admixed with a substance for contributing mobility to the mixture; or a material, such as metallic magnesium preferably in comminuted or powdered form for facilitating extrusion and which is adapted for subsequent treatment for changing it into a material having electrical insulating properties. We have also used the term "high pressure" and "highly condensed" with reference to the insulating material and the manner of applying the same to the resistor. These expressions are not to be considered in a limiting sense but are used broadly to mean a sufficient pressure to cause the insulating material to penetrate effectively the interstitial spaces of the convolutions or coils of the resistor, and other spaces; and to provide a dependable insulating medium. The actual pressure used in the method depends to a large extent upon the particular type or character of heating unit, resistor and insulating material.

It is therefore to be understood that the several embodiments of the invention herein disclosed are merely illustrative and are not to be considered in a limiting sense, and that our invention is limited only in accordance with the scope of the appended claims.

Having thus described our invention, what we claim is:

1. The method of forming electrical resistor units of the character described which consists in arranging within a mold a sheath in which is positioned a form to which is affixed a resistor, closing said sheath and extruding thereinto under high pressure sufficient insulating material to thoroughly insulate the resistor, and separating the mold and sheath with resistor therein and heating and drying the unit.

2. The method of forming electrical resistors of the character herein described which consists in arranging within a mold a sheath having a core of insulating material positioned therein and to which is affixed a resistor, closing the end of the sheath and extruding therein and about the resistor under high pressure a sufficient quantity of insulating material to thoroughly insulate the resistor and then separating the mold and sheath with resistor therein.

blown in on the periphery of the reaction zone through a large number of passages 16 which are disposed in the sense previously defined and directed horizontally or inclined upwardly relative to the activation material. These passages are in communication with the gas space of the reaction zone by means of a passage 17 disposed radially and downwardly at an angle in such a way that the gases are sucked in by the injector-like action of the gases which are sharply blown in. In this way, the combination of the oxygen with the reaction products takes place inside the combustion passage 16 so that only activating agents ($H_2O$, $CO_2$) can enter the reaction zone. As in the previous embodiment, the oxygen containing gas cannot come directly in contact with the activation material.

The process has proved successful in practice and all the above described effects have been obtained. By reason of the possibility of using cheap raw products as activation material in granular or powdery form, as well as by reason of obtaining a useful gas and other valuable by-products, the new process has great advantages from a technical point of view, particularly because the process is thermally self-containing and the use of heating agents is not necessary either outside or inside the apparatus.

Changes may be made within the scope and spirit of the appended claims wherein I have defined what I believe to be new and desire to have protected by Letters Patent.

I claim:

1. In a furnace for producing activated carbon, an upright cylindrical housing, means dividing said housing into a plurality of intercommunicating superimposed treating zones, means for introducing carbonaceous material into the uppermost zone, a hollow rotatable shaft centrally positioned in said housing, said shaft being closed at both ends, sets of hollow rabble arms communicating with the interior of said shaft and projecting laterally into said zones, means carried by said arms for agitating the said material and for advancing it from zone to zone, means including a pipe extending into said shaft through the upper closure thereof for passing a reaction agent downward through the hollow shaft to the rabble arms in one of the lower zones, means in said last mentioned rabble arms only for ejecting said reaction agent into the associated zone, where combustion takes place for supplying heat to said zone and to the zones above, and means for causing said reaction agent, in its downward movement, to pass laterally outward and back again through a plurality of the rabble arms in the upper zones, whereby a simultaneous heating of the reaction agent and cooling of the gaseous products in the upper zones is produced, said last means including a closure for the lower end of said pipe and a plurality of open-ended branches of said pipe extending into the said rabble arms in the upper zones.

2. In a furnace for producing activated carbon, an upright cylindrical housing, means dividing said housing into a plurality of intercommunicating superimposed treating zones, means for introducing carbonaceous material into the uppermost zone, a hollow rotatable shaft centrally positioned in said housing, sets of hollow rabble arms communicating with the interior of said shaft and projecting laterally into said zones, means carried by said arms for agitating the said material and for advancing it from zone to zone, means for passing a reaction agent downward through the hollow shaft to the rabble arms in one of the lower zones, means in said last mentioned rabble arms for ejecting said reaction agent into the associated zone, where combustion takes place for supplying heat to said zone and to the zones above, means for causing said reaction agent, in its downward movement, to pass laterally outward and back again through a plurality of the rabble arms in the upper zones, whereby a simultaneous heating of the reaction agent and cooling of the gaseous products in the upper zones is produced, and means for varying the proportion of reaction agent which passes through the rabble arms of a particular upper zone as regards the amount of reaction agent which passes through the rabble arms of the other upper zones in order to vary the degree of cooling which takes place in said particular zone.

3. In a furnace for producing activated carbon, an upright cylindrical housing, a hollow rotatable shaft centrally disposed in said housing, said shaft being closed at both ends, a plurality of annular shelves secured to the wall of said housing and dividing the same into a plurality of superimposed treating zones, including a reaction zone, alternate central and peripheral openings in said shelves affording communication between zones, means for introducing carbonaceous material into the upper zone, sets of hollow rabble arms carried by said shaft and laterally projecting therefrom into said zones, means carried by said arms for agitating the material and for advancing it from zone to zone, a pipe for supplying a reaction agent entering said shaft through the closure at the top and extending downward past a plurality of said zones, open-ended branches of said pipe extending in spaced relation into the said hollow rabble arms located in the several zones past which said pipe extends, the said branches and the hollow rabble arms into which they extend affording passageways extending from said pipe to the annular space in the hollow shaft surrounding it, a closure for said pipe at the bottom preventing direct communication between the pipe and said annular space and causing said reaction agent to flow through said passageways and thence to the hollow rabble arms in said reaction zone by way of the annular space surrounding said pipe, and openings in said last mentioned rabble arms through which said reaction agent is ejected into said reaction zone.

4. Apparatus for continuously treating substantially finely divided carbonaceous material to produce activated carbon, comprising a vertically extending internally substantially cylindrical housing, a curing zone disposed at the bottom of said housing, an activating zone the diameter of which is greater than its height disposed above said curing zone, a series of intermediate treating zones disposed above said activating zone, communicating apertures between said zones, means for inserting carbonaceous material into the top zone, a rotatable shaft extending vertically centrally through all said zones, sets of rabble arms carried by said shaft and laterally projecting therefrom into the respective zones, scraping means carried by said arms for agitating the material in the respective zones and for continuously advancing it downwardly from zone to zone by way of said communicating apertures when said shaft is rotated, a large number of small combustion chambers located circumferentially around the inner wall of said housing and opening into said activating zone above the level of the material therein, an injector tube extending into each said chamber from outside the housing and sealed into the wall thereof, said tubes and chambers being disposed at an angle to the diameter of the housing, means for supplying oxygen containing gases to said injector tubes, and a short passageway associated with each said chamber for withdrawing gaseous reaction products from said activating zone and for conveying such products into the associated chamber adjacent the injector tube therein, the said reaction products being burned in said chambers by the oxygen supplied through said injector tubes to furnish heat to the said activation zone and to the other zones.

5. In a furnace for producing activated carbon, an upright cylindrical housing, means dividing said housing into a plurality of intercommunicating superimposed treating zones, means for introducing carbonaceous material into the uppermost zone, a hollow rotatable shaft centrally positioned in said housing, said shaft being close at both ends, sets of hollow imperforate rabble arms communicating with the interior of said shaft and projecting laterally into a plurality of the upper zones, another set of hollow rabble arms communicating with the interior of said shaft and projecting laterally into a lower zone, said last mentioned rabble arms having openings for the ejection of a reaction agent, means including a pipe for supplying reaction agent under pressure, said pipe passing through the closure at the upper end of said hollow shaft and passing downward in spaced relation to the walls of said shaft past all said sets of imperforate rabble arms and terminating in a closed end above the said rabble arms having ejection openings, and a communication path over which the reaction agent is caused to flow from said pipe to said rabble arms having ejection openings, said path including open-ended branches of said pipe extending in spaced relation into the said imperforate rabble arms, the annular spaces surrounding said branches, and the annular space surrounding said pipe.

OSWALD HELLER.